US012039876B1

(12) United States Patent
Tian et al.

(10) Patent No.: US 12,039,876 B1
(45) Date of Patent: Jul. 16, 2024

(54) METHOD AND SYSTEM FOR AIRPORT PAVEMENT STRUCTURAL PERFORMANCE EVALUATION USING LONG-RANGE LASER DOPPLER VIBROMETER

(71) Applicant: TONGJI UNIVERSITY, Shanghai (CN)

(72) Inventors: Yu Tian, Shanghai (CN); Jianming Ling, Shanghai (CN); Hongduo Zhao, Shanghai (CN); Xindong Zhao, Shanghai (CN); Le Liu, Shanghai (CN); Jinyu Wu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/396,929

(22) Filed: Dec. 27, 2023

(30) Foreign Application Priority Data

Dec. 31, 2022 (CN) .......................... 202211741422.5

(51) Int. Cl.
*G01M 5/00* (2006.01)
*G08G 5/00* (2006.01)
(52) U.S. Cl.
CPC ........ *G08G 5/0086* (2013.01); *G01M 5/0066* (2013.01); *G01M 5/0091* (2013.01)

(58) Field of Classification Search
CPC . G08G 5/0086; G01M 5/0066; G01M 5/0091
See application file for complete search history.

(56) References Cited

FOREIGN PATENT DOCUMENTS

CN          115164967 A      10/2022

OTHER PUBLICATIONS

Jianming Ling et al., Airport Intelligent Runway System Architecture and Key Technologies, China Civil Engineering Journal, vol. 55 No. 2, Issue Dated Feb. 28, 2022.

*Primary Examiner* — Zhihan Zhou
(74) *Attorney, Agent, or Firm* — Daniel M. Cohn; Howard M. Cohn

(57) ABSTRACT

The present disclosure relates to a method and system for pavement structural performance evaluation based on long-range laser vibration measurement. The method can more accurately evaluate the structural performance of the pavement by detecting the actual deflection value of the pavement during aircraft operation; By obtaining real-time deflection data of the airport runway, it is possible to detect changes in the structural performance of the airport runway in the long term without affecting the normal operation of the airport runway. The present invention has strong anti-interference ability, stable detection results, and can achieve non-contact, large-scale, and high-precision measurement of airport pavement deflection.

4 Claims, 4 Drawing Sheets use laser vibrometer to detect deflection and deformation of an airport pavement during an aircraft operation.

Based on the deflection data and aircraft information, a slab elastic modulus and a subgrade reaction modulus are calculated by backcalculation.

Based on the elastic modulus and the reaction modulus, calculate PCN to evaluate the structural performance of the airport pavement.

METHOD AND SYSTEM FOR AIRPORT PAVEMENT STRUCTURAL PERFORMANCE EVALUATION USING LONG-RANGE LASER DOPPLER VIBROMETER

CROSS-REFERENCE OF RELATED APPLICATIONS

This patent application claims the benefit and priority of Chinese Patent Application No. 202211741422.5 filed on Dec. 31, 2022, the disclosure of which is incorporated by reference herein in its entirety as part of the present application.

TECHNICAL FIELD

The present disclosure relates to the evaluation of structural performance of airport pavement, in particular to a method and system for airport pavement structural performance evaluation using long-range laser doppler vibrometer.

BACKGROUND

Deflection is the deformation of the road surface under load, which is a comprehensive indicator reflecting the structural performance of pavements. Based on the deflection information, pavement structural information such as pavement structural bearing capacity, modulus of each structural layer, joint load transfer, and voids under concrete pavement slab can be obtained.

Structural performance evaluation is one of the core contents of airport pavement airworthiness assessment. Initially, static deflectometer such as Beckman Beam were mainly used for deflection detection of airport pavement. However, the testing of such static deflectometer has disadvantages such as slow speed, low efficiency, complex operation steps, and unstable reference frame, making it difficult to use as a large-scale deflection detection method. In recent years, the mainstream equipment for pavement deflection detection is the Falling Weight Deflectometer (FWD) and the Heavy Weight Deflectometer (HWD), both of them are non-destructive testing equipment, whose main principle is to obtain the deflection response data of pavement structure by releasing the falling weight to apply pulse load to the ground. Due to the thickness of the airport pavement, HWD is generally used for deflection detection of the airport pavement. Compared to Beckman Beam, FWD/HWD has the advantages of high efficiency and accuracy. However, there are still the following shortcomings in actual pavement deflection detection:

1. The variability of deflection detection data is significant. Through on-site research on airport runway tests at 8 domestic airports, including Shanghai Hongqiao International Airport and Changzhou Benniu International Airport, it was found that the variable coefficient of most test data at the surveyed airports exceeded 15%, indicating significant variability.
2. Only FWD/HWD can be used to regularly detect the deflection of airport pavements, and real-time tracking of structural performance information of airport pavements is not possible.
3. Deflection detection has a certain impact on airport traffic. During detection, it is necessary to occupy the airport runway, which will affect the normal operation of the airport runway.

Therefore, how to evaluate the structural performance of an airport pavement in a long-term and accurate manner without affecting the normal operation of airport runways has become an urgent technical problem to be solved.

SUMMARY

The present disclosure aims to overcome the shortcomings of the existing technologies and provide a method and system for airport pavement structural performance evaluation using long-range laser doppler vibrometer. The method utilizes a laser vibration meter to perform non-contact and high-precision real-time deflection detection on an airport pavement when the aircraft passes by, thereby achieving an evaluation of structural performance of the airport pavement.

To achieve the purpose, one aspect of the disclosure is directed to a method for pavement structural performance evaluation based on long-range laser vibration measurement, comprises:

S1. Use laser doppler vibrometer to detect an airport pavement and obtain deflection data of the airport pavement during an aircraft operation;

S2. Based on the deflection data, a slab elastic modulus and a subgrade reaction modulus of the airport pavement are calculated by backcalculation;

S3. Based on the elastic modulus and the reaction modulus, calculate pavement classification number to evaluate the structural performance of the airport pavement.

In the above method, step S1 comprises:

S1.1. Install laser doppler vibrometer, high-definition cameras, and laser wheel trackers at edge lights on both sides of an airport runway;

S1.2. Select a set of suitable types of aircraft, determine a position of their wheel track belt, and adjust lenses at a front end of the laser doppler vibrometer, so that lasers emitted by the lenses hit the wheel track belt;

S1.3. Collect detection data during the operation of the selected aircraft, including vibration information of measuring points detected by the laser doppler vibrometer, high-definition photos taken by the high-definition cameras, aircraft type and wheel track information detected by the laser wheel trackers;

S1.4. Select effective parts of the detection data collected in step S1.3 based on the high-definition photos, and draw a curve of deflection & with time t at the measuring points during the aircraft operation;

S1.5. When similar aircraft types or aircraft types with similar loads are operating on the airport runway, multiple sets of detection data of the same measuring point are collected, and a variable coefficient of the detection data is calculated to evaluate the detection accuracy of steps S1.1-S1.4; reference the variable coefficient, the curve obtained in step S1.4 is modified and used as the deflection data, to view the variation of the deflection of the airport pavement;

S1.6. For other types of aircraft, repeat steps S1.2 to S1.5 to obtain the deflection data of different types of aircraft.

In the above method, step S2 comprises:

S2.1. According to the modified curve obtained in step S1.5, an expression, named deflection time-domain δ(t) corresponding to the deflection & with time t is fitted;

S2.2. Using the deflection time-domain δ(t), an area index $A_i$ of the deflection time-domain δ(t) as a derivative index is constructed:

$$A_i = \frac{\int_{t_m}^{t_n} \delta(t) v(t) dt}{\delta_i}$$

Wherein, v(t) represents aircraft operating speed curve;

S2.3. Calculate subgrade reaction modulus $K_i$ by plugging in the $A_i$:

$$K_i = \frac{qr\omega_i(A_i)}{\delta_i}$$

Wherein, q represents aircraft tire ground pressure, MPa;

r represents equivalent circular uniformly distributed load grounding area radius;

$\omega_i(A_i)$ represents deflection coefficient at the measuring point;

$\delta_i$ represents deflection at the measuring point;

S2.4 Calculate slab elastic modulus $E_i$ by plugging in the $K_i$:

$$E_i = \frac{12(1-\mu^2)K_i(l_i(A_i))^4}{h^3} \times 10^{-3}$$

Wherein, $l_i(A_i)$ represents relative stiffness radius of the slab at the measuring point;

μ represents poisson's ratio of the slab;

h represents effective thickness of the slab.

Another aspect of the disclosure is directed to a system for pavement structural performance evaluation based on long-range laser vibration measurement, comprises:

Laser doppler vibrometer, located at the edge lights on both sides of an airport runway, are used to obtain deflection data at measuring points on the airport pavement;

High-definition cameras, also located at the edge lights on both sides of the airport runway, are used to take high-definition photos of deflection measurement points;

Laser wheel trackers, are used to detect the operating position of an aircraft on the airport runway, the type of the aircraft, and determine the load applied to the airport runway during the operation of the aircraft.

In a preferred embodiment, the system further comprises c, which located directly above the laser doppler vibrometer, are used to detect the axial, lateral, and angular acceleration at the position of the laser doppler vibrometer.

The present invention has the following advantages:

1. The present invention has strong anti-interference ability, stable detection results, and are mounted on the ancillary facilities of airport runways, without the need for on-site operation by personnel, reducing the cost of airport pavement detection. It can achieve non-contact, large-scale, and high-precision measurement of airport pavement deflection.

2. The present invention can obtain the actual deflection value of the pavement during aircraft operation by installing edge lights on both sides of the airport runway. Compared with HWD testing, it has more practical significance and value, improves detection accuracy and inversion accuracy of pavement structural parameters, and can more accurately evaluate the structural performance of the pavement.

3. The present invention achieves long-distance measurement of pavement deflection by installing it on edge lights, which can achieve long-term and real-time monitoring of pavement deflection, greatly improving detection frequency, and does not require occupying the airport runway during detection, thus not affecting the normal operation of the airport runway.

DETAILED DESCRIPTION OF THE EMBODIMENTS

The present disclosure is further described in detail in combination with drawings and specific embodiments. The following embodiments are implemented on the premise of the technical solution, a detailed implementation mode and a specific operation process are provided, but the protection range of the present disclosure is not limited to the following embodiments.

Definitions

Airport pavement (can be called pavement for short), as used herein refers to a ground cover of the airport runway, taxiway, apron and other aircraft operation areas. These overlays are usually made of specific materials (e.g., asphalt, cement concrete) and are designed to withstand the weight of the aircraft and the various forces generated during operation.

Slab, as used herein refers to an airport pavement slab, is a single plate of precast or in-situ cement concrete in an airport runway, taxiway or apron.

Subgrade, as used herein refers to a reinforced layer of soil that forms the base of an airport road or airport runway. In airport construction, the pavement is the foundation of the airport runway, taxiway and apron, and its stability and bearing capacity have a direct impact on the performance of the whole pavement. The Subgrade needs to be properly treated and compacted to ensure that they can support the pavement structure above evenly and stably.

Figure 1:
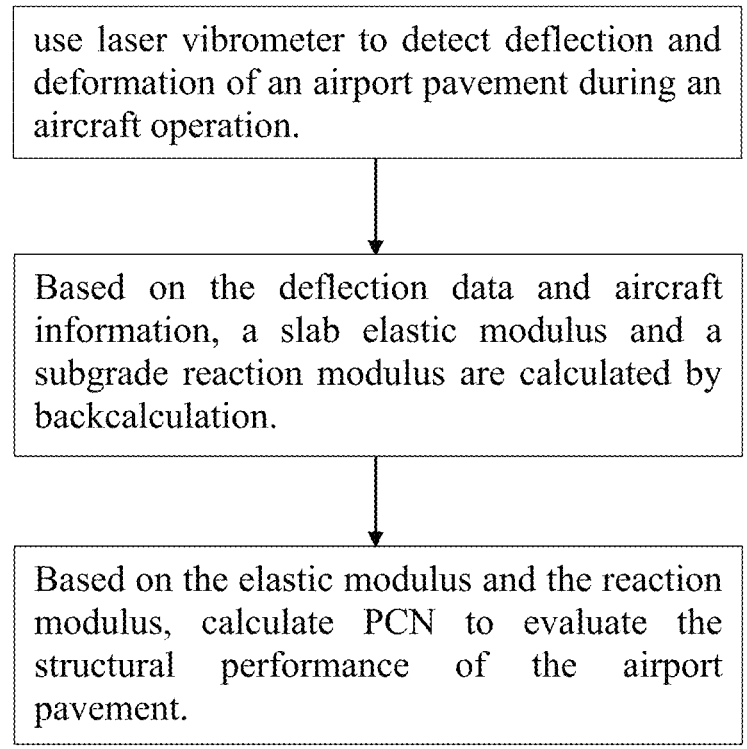
FIG. 1 is a flow diagram of the method of the present invention.

As shown in FIG. 1, the method for pavement structural performance evaluation based on long-range laser vibration measurement, comprises:

S1. Use laser doppler vibrometer to detect an airport pavement and obtain deflection data of the airport pavement during an aircraft operation, comprising the following steps:

S1.1 Choose an airport runway with edge lights, install laser doppler vibrometer, high-definition cameras, and laser wheel trackers at the edge lights on both sides of the airport runway;

The present disclosure is based on the laser Doppler effect and the principle of heterodyne interference to detect road surface deflection. The main principle is that the Doppler effect refers to the change in the wavelength of object radiation due to the relative motion between the wave source and the observer, that is, when the observer and the wave source are far away from each other, the wave is elongated, the wavelength becomes longer, and the frequency becomes lower; When the observer approaches the wave source, the wave is compressed, the wavelength becomes shorter, and the frequency becomes higher. The principle of heterodyne interference refers to the generation of a small frequency difference between the broadcast frequencies of two coherent beams, causing continuous scanning of interference fringes in the interference field. The optical signal in the interference field is converted into an electrical signal by a photodetector, and the phase difference of the interference field is calculated by a computer.

The principle of a laser doppler vibrometer is that the beam splitter (BS1) divides a laser beam into a reference beam and a measurement beam, after passing through the second beam splitter (BS2), the measurement beam is focused on the sample and reflected. The reflected beam is deflected downwards by BS2 and then merged with the reference beam onto the detector. Since the optical path of the reference beam is constant, the movement of the measurement object creates bright/dark fringes on the detector, resulting in the interference of the beam. A complete bright/dark periodic stripe on the detector corresponds exactly to the displacement of half a wavelength of the laser used. The change in optical path per unit time is manifested as the Doppler frequency shift of the measured beam, which means that the Doppler frequency shift is directly proportional to the vibration velocity of the sample. Due to the fact that the light and dark stripes and modulation frequency generated by the movement of objects away from or towards the interferometer are the same, this design cannot detect the direction of object movement. In view of this, an acousto-optic modulator (Bragg box) with a typical optical frequency shift of 40 MHz is placed in a reference beam (laser frequency of $4.7 \times 10^{14}$ Hz). When the sample is static, a typical interference modulation frequency of 40 MHz will be generated; When the sample moves towards the interferometer, the frequency received by the detector is greater than 40 MHz; When the sample moves away from the interferometer, the frequency received by the detector is less than 40 MHz. Thus, the length of the optical path and the direction of movement of the measured object can be accurately detected.

Figure 2:
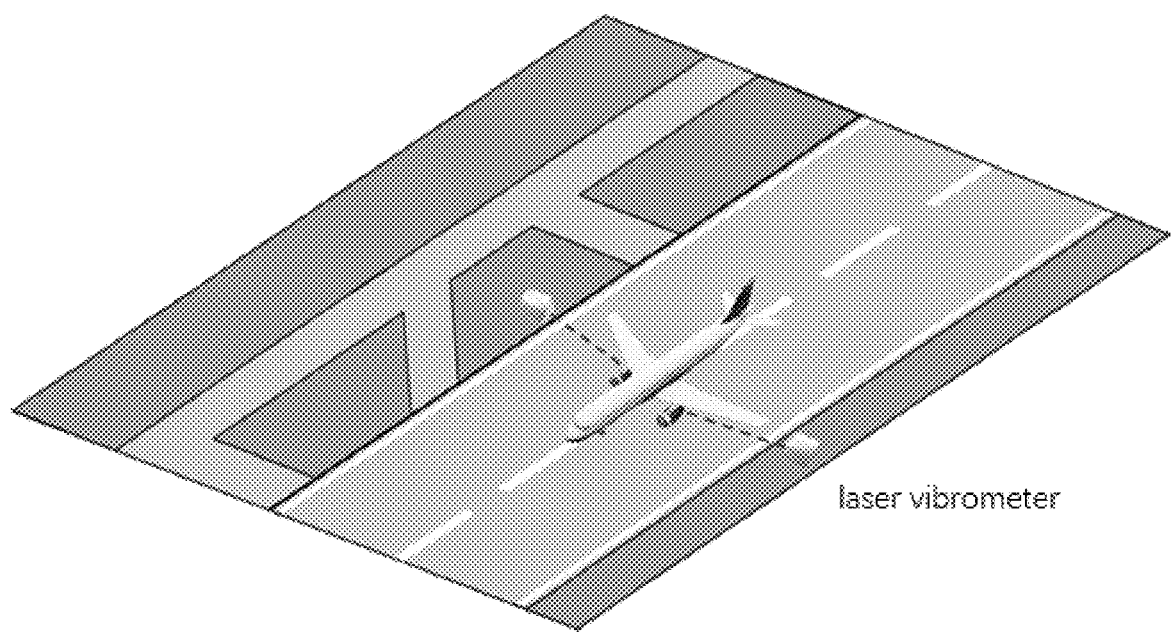
FIG. 2 is a schematic diagram of the laser doppler vibrometer detecting airport pavement deflection.

As shown in FIG. 2, the laser doppler vibrometer are placed on the edge lights on both sides of the airport runway. When the aircraft slides on the airport runway, the laser doppler vibrometer can capture the deflection of the measurement points on the airport runway. When the laser doppler vibrometer are in operation, factors such as aircraft taxiing and external wind can cause the vibration of the laser doppler vibrometer, resulting in the measured deflection data including the vibration of the laser doppler vibrometer itself. Therefore, in the process of deflection detection, a compensator is needed to eliminate the influence of vibration on the test. In the present invention, an accelerometer and a laser doppler vibrometer are installed in one place, that is, the accelerometer is located directly above the laser doppler vibrometer. The accelerometer obtains the axial, lateral, and angular accelerations of the position of the instrument (laser doppler vibrometer) to be compensated, and obtains the axial, lateral, and angular displacements of the position of the instrument to be compensated by integrating twice; Then adjust the time domain corresponding to the displacement through algorithms to compensate for the detection data measured by the laser doppler vibrometer.

S1.2. Select a set of suitable types of aircraft, determine a position of their wheel track belt, and adjust lenses at a front end of the laser doppler vibrometer, so that lasers emitted by the lenses hit the wheel track belt;

When conducting deflection detection on airport pavement, appropriate positions for measurement points should be selected, and the main factors such as the aircraft's position, type, and load should be determined to facilitate the subsequent evaluation of pavement structural performance.

(1) Selection of measurement points: In order to detect the maximum deflection of the airport runway during aircraft operation and consider laser accessibility, the contact point between the outer edge of the aircraft's main landing gear tires and the airport runway should be selected as the maximum deflection measurement point. Therefore, when conducting deflection detection on airport pavement, the laser measuring point position should be placed on the wheel track belt of the selected aircraft type to increase the effective detection frequency. To detect the deflection of the pavement caused by various types, a lens is installed at the front end of the laser, and the refractive angle of the lens to the laser is adjusted to conduct the detection of pavement deflection generated by various types. However, during the operation of the aircraft on the airport runway, the position of the aircraft may deviate from the wheel track of the type. In order to determine the accuracy of the deflection detection data, high-definition cameras are used during the laser doppler vibrometer detection, focusing on the contact position of the laser on the pavement, to determine that the measurement point is the contact point between the outer edge of the main landing gear tires and the pavement.

(2) Selection of position, type, and load of the aircraft: the selected laser wheel trackers should be able to detect the operating position of the aircraft on the airport runway, identify the aircraft type, and determine the load applied to the airport pavement during the operation of the aircraft.

S1.3. Collect detection data during the operation of the selected aircraft, including vibration information of measuring points detected by the laser doppler vibrometer, high-definition photos taken by the high-definition cameras, aircraft type (type i) and wheel track information detected by the laser wheel trackers.

Figure 3:
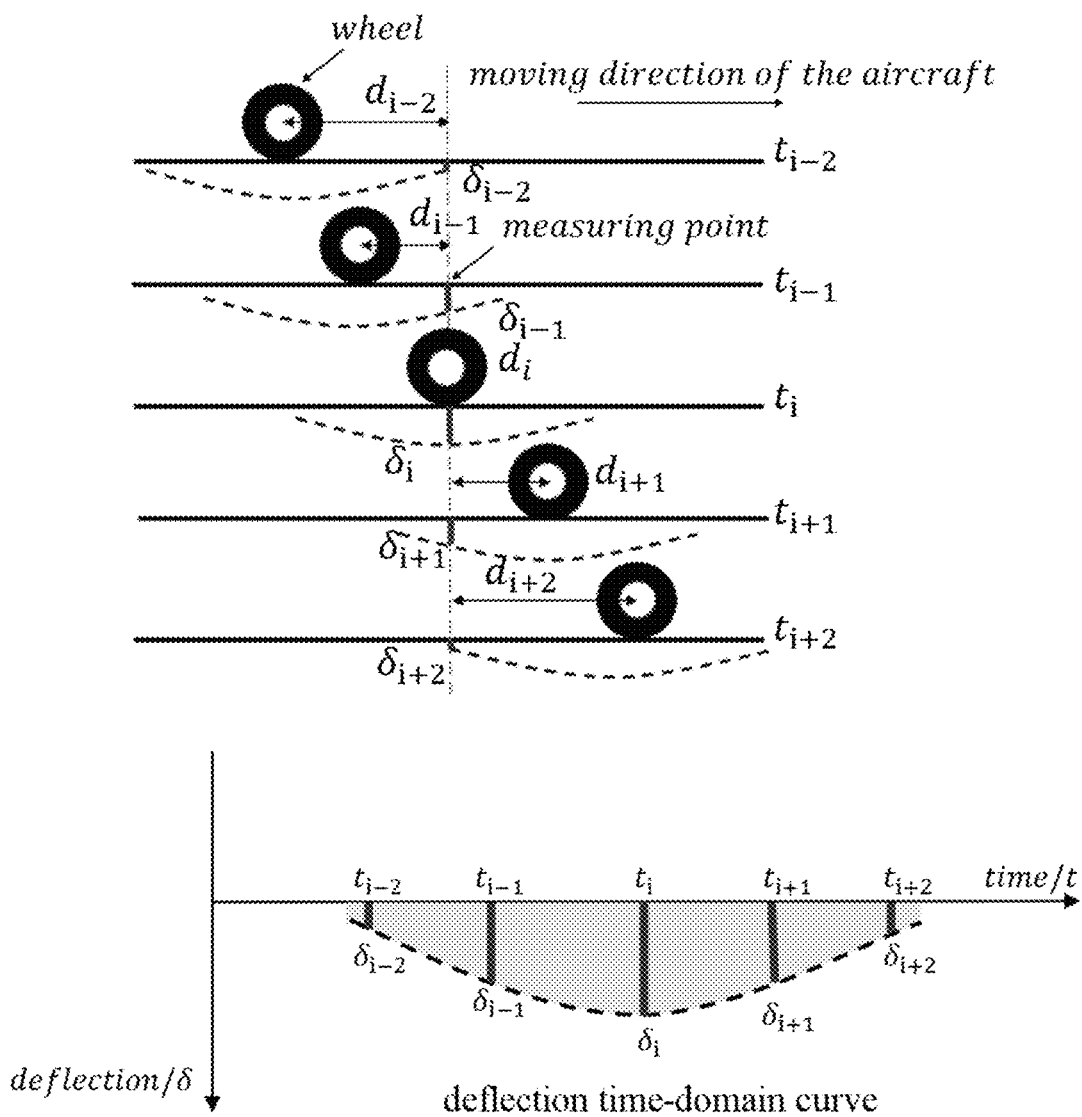
FIG. 3 shows the obtaining of the curve of deflection time domain.

S1.4. Select effective parts of the detection data collected in S1.3 based on the high-definition photos, and draw a curve of deflection & with time t at the measuring points during the aircraft operation, the curve is shown in FIG. 3.

S1.5. When similar aircraft types or aircraft types with similar loads are operating on the airport runway, multiple sets of detection data of the same measuring point are collected, and a variable coefficient of the detection data is calculated to evaluate the detection accuracy of steps S1.1-S1.4; reference the variable coefficient, the curve obtained in step S1.4 is modified and used as the deflection data, to view the variation of the deflection of the airport pavement;

S1.6. For other types of aircraft, repeat steps S1.2 to S1.5 to obtain the deflection data of different types of aircraft.

S2. Based on the deflection data, a slab elastic modulus and a subgrade reaction modulus of the airport pavement are calculated by backcalculation;

Based on the effective thickness of the airport pavement slab, type of the aircraft and load information, and the curve of deflection & with time t at the measuring points measured in step S1, the slab elastic modulus and the subgrade reaction modulus of the airport pavement are calculated by backcalculation, including the following steps:

S2.1. The modified curve obtained in S1.5 fitted with an expression, named deflection time-domain δ(t) corresponding to the deflection & with time t;

S2.2. Using the deflection time-domain δ(t), an area index $A_i$ of the deflection time-domain δ(t) as a derivative index is constructed:

$$A_i = \frac{\int_{t_m}^{t_n} \delta(t)v(t)dt}{\delta_i}$$

Wherein, v(t) represents aircraft operating speed curve;

S2.3. Calculate subgrade reaction modulus $K_i$ by plugging in the $A_i$:

$$K_i = \frac{qr\omega_i(A_i)}{\delta_i}$$

Wherein, q represents aircraft tire ground pressure, MPa;
r represents equivalent circular uniformly distributed load grounding area radius, m;
$\omega_i(A_i)$ represents deflection coefficient at the measuring point, $m^{-1}$;
$\delta_i$ represents deflection at the measuring point, m.

S2.4. Calculate slab elastic modulus $E_i$ by plugging in the $K_i$:

$$E_i = \frac{12(1-\mu^2)K_i(l_i(A_i))^4}{h^3} \times 10^{-3}$$

Wherein, $l_i(A_i)$ represents relative stiffness radius of the slab at the measuring point, m;
μ represents poisson's ratio of the slab;
h represents effective thickness of the slab, m.

S3. Based on the slab elastic modulus and the subgrade reaction modulus, calculate pavement classification number to evaluate the structural performance of the airport pavement.

Figure 4:
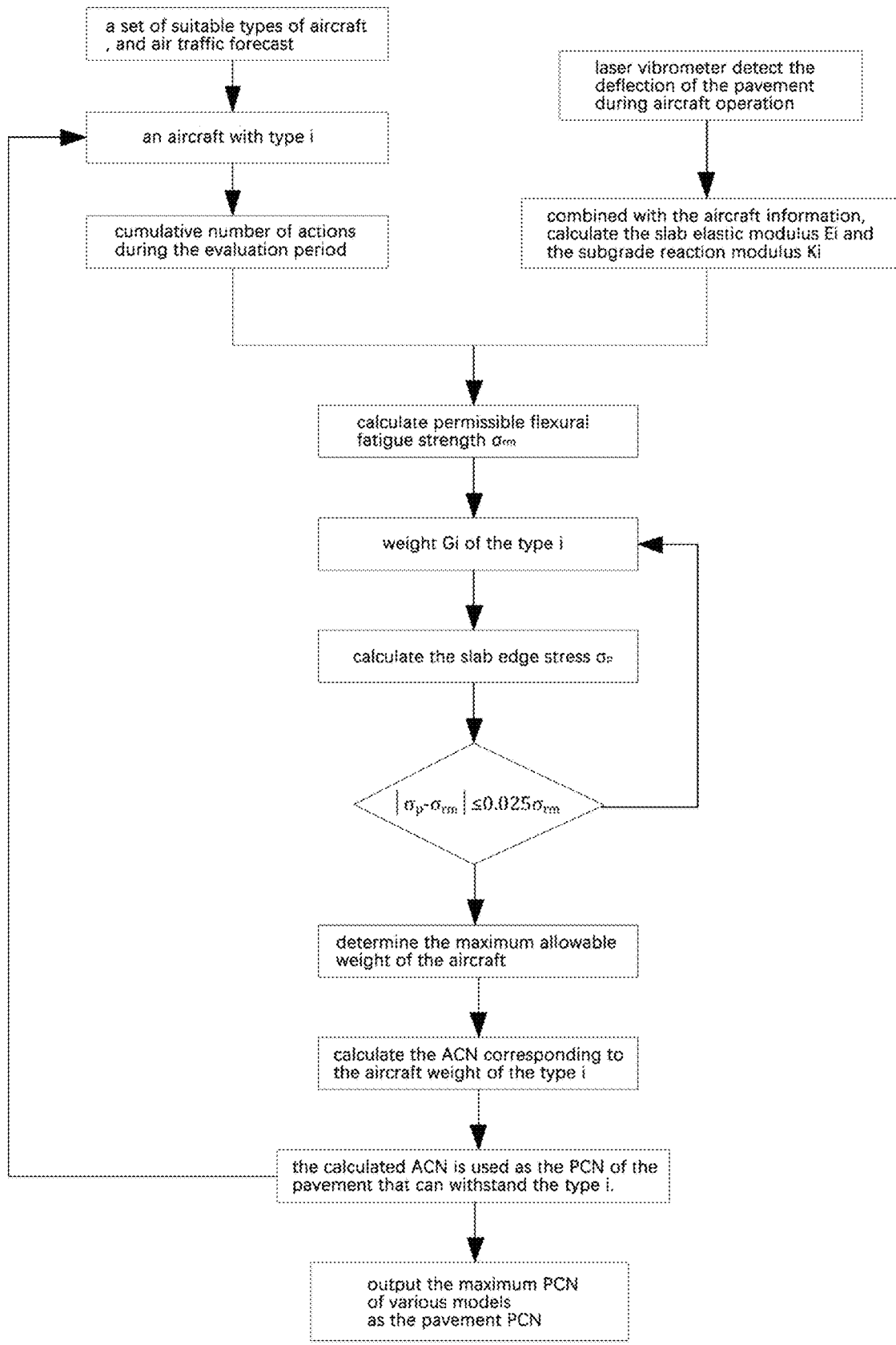
FIG. 4 shows a flow diagram for calculating the pavement classification number based on the elastic modulus and the reaction modulus.

Determine the strength level of the pavement based on the elastic modulus and the reaction modulus, and use the design aircraft method to calculate the PCN value of the pavement slab during the evaluation period to finish the structural performance evaluation of the airport pavement, as shown in FIG. 4, including the following steps:

S3.1. Based on the slab elastic modulus $E_i$, the subgrade reaction modulus $K_i$, and cumulative number of actions during the evaluation period, calculate permissible flexural fatigue strength $\sigma_{rm}$, S3.2. According to the weight $G_i$ of the aircraft (type i), calculate the slab edge stress ϕp, $$|\sigma_p - \sigma_{rm}| \leq 0.025\sigma_{rm}$$

S3.3. Based on the slab edge stress σp, determine the maximum allowable weight of the aircraft.

S3.4. Calculate the ACN (Aircraft Classification Rating) corresponding to the aircraft weight of type i.

S3.5. The calculated ACN is used as the PCN of the pavement that can withstand the type i.

S3.6. Output the maximum PCN of various types as the pavement PCN.

What is claimed is:

1. A method for pavement structural performance evaluation based on long-range laser vibration measurement, comprising:
    S1. use laser doppler vibrometer to detect an airport pavement and obtain deflection data of the airport pavement during an aircraft operation;
    S2. based on the deflection data, a slab elastic modulus and a subgrade reaction modulus of the airport pavement are calculated by backcalculation;
    S3. based on the slab elastic modulus and the subgrade reaction modulus, calculate pavement classification number to evaluate the structural performance of the airport pavement;
    wherein, step S1 includes:
    S1.1. install laser doppler vibrometer, high-definition cameras, and laser wheel trackers at edge lights on both sides of an airport runway;
    S1.2. select an aircraft, determine a wheel track belt of the aircraft, and adjust lenses at a front end of the laser doppler vibrometer, so that lasers emitted by the lenses hit the wheel track belt;
    S1.3. collect detection data during the operation of the selected aircraft, including vibration information of measuring points detected by the laser doppler vibrometer, high-definition photos taken by the high-definition cameras, aircraft type and wheel track information detected by the laser wheel trackers;
    S1.4. select the detection data collected in step S1.3 based on the high-definition photos, and draw a curve of deflection δ with time f at the measuring points during the aircraft operation;

S1.5. when same aircraft types or aircraft types with same loads are operating on the airport runway, multiple sets of detection data of the same measuring point are collected, and a variable coefficient of the detection data is calculated to evaluate the detection accuracy of steps S1.1-S1.4; reference the variable coefficient, the curve obtained in step S1.4 is modified and used as the deflection data, to view the variation of the deflection of the airport pavement;

S1.6. for other types of aircraft, repeat steps S1.2 to S1.5 to obtain the deflection data of different types of aircraft.

2. The method according to claim 1, further comprising: accelerometer, which are located directly above the laser doppler vibrometer; the accelerometer obtains axial, lateral, and angular accelerations of the position of the laser doppler vibrometer, and obtains axial, lateral, and angular displacements of the same position by integrating twice; then adjust the time domain corresponding to the displacement through algorithms to compensate for the detection data measured by the laser doppler vibrometer.

3. The method according to claim 1, wherein step S2 comprises:
based on the effective thickness of the airport pavement slab, the type of the aircraft, load information, and the deflection data, the slab elastic modulus and the subgrade reaction modulus of the airport pavement are calculated by backcalculation.

4. The method according to claim 3, wherein the slab elastic modulus and the subgrade reaction modulus are calculated by the following steps:

S2.1. according to the modified curve obtained in S1.5, an expression, named deflection time-domain $\delta(t)$ corresponding to the deflection $\delta$ with time t is fitted;

S2.2. using the deflection time-domain $\delta(t)$, an area index $A_i$ of the deflection time-domain $\delta(t)$ as a derivative index is constructed:

$$A_i = \frac{\int_{t_m}^{t_n} \delta(t)v(t)dt}{\delta_i}$$

wherein, $v(t)$ represents aircraft operating speed curve;

S2.3. Calculate subgrade reaction modulus $K_i$ by plugging in the $A_i$:

$$K_i = \frac{qr\omega_i(A_i)}{\delta_i}$$

wherein, q represents aircraft tire ground pressure, MPa;
r represents equivalent circular uniformly distributed load grounding area radius;
$\omega_i(A_i)$ represents deflection coefficient at the measuring point;
$\delta_i$ represents deflection at the measuring point;

S2.4 Calculate slab elastic modulus $E_i$ by plugging in the $K_i$:

$$E_i = \frac{12(1-\mu^2)K_i(l_i(A_i))^4}{h^3} \times 10^{-3}$$

wherein, $l_i(A_i)$ represents relative stiffness radius of the slab at the measuring point;
$\mu$ represents poisson's ratio of the slab;
h represents effective thickness of the slab.

* * * * *